July 26, 1966  P. D. ABBOTT  3,262,715
VEHICLE HAVING SELECTIVELY FIXED OR
FLOATING STEERABLE WHEELS
Filed Aug. 21, 1964  2 Sheets-Sheet 1
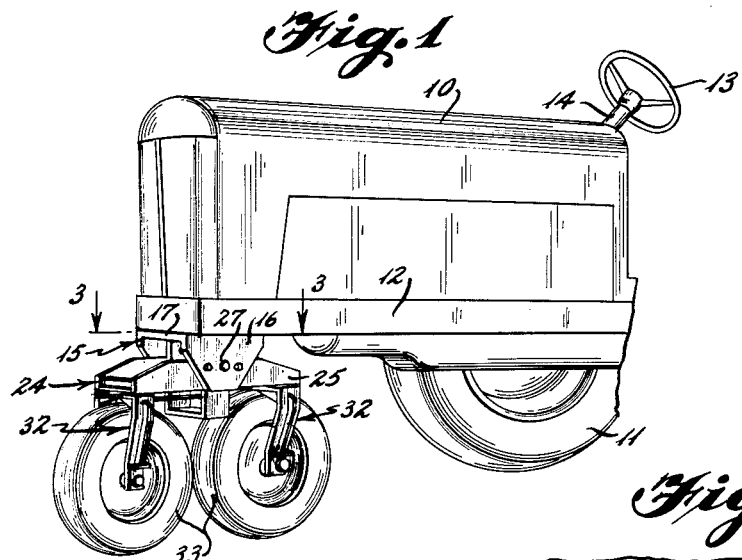
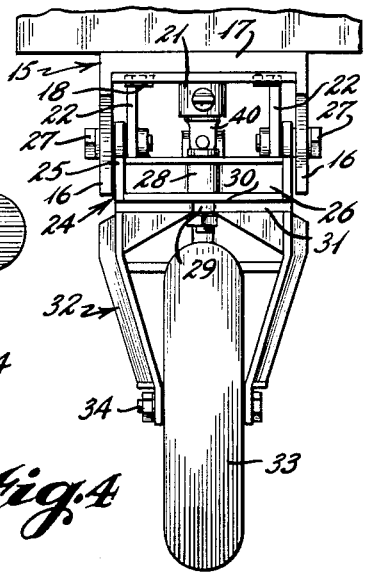
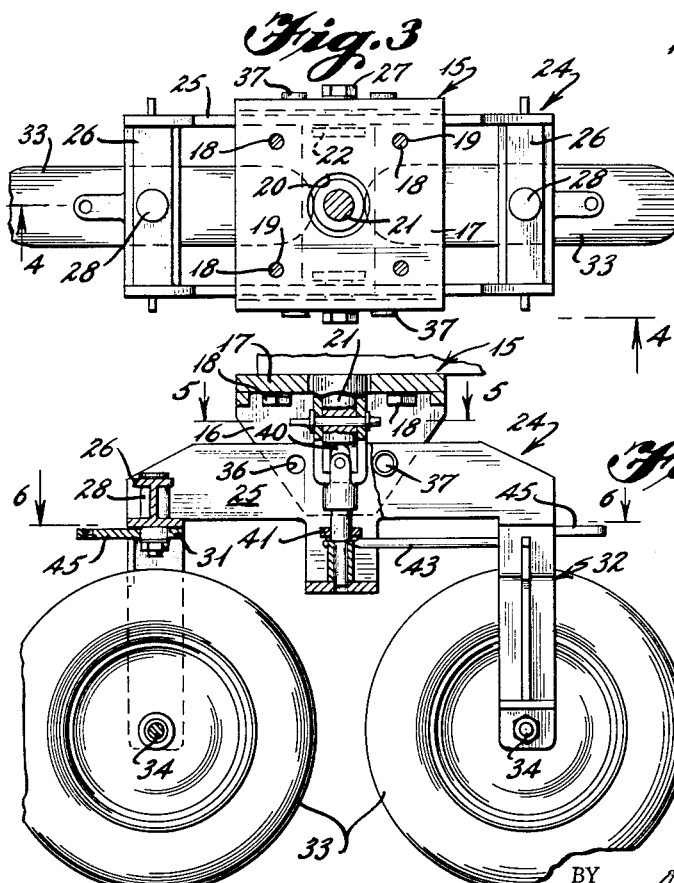
INVENTOR
Paul D. Abbott
BY
ATTORNEYS July 26, 1966  P. D. ABBOTT  3,262,715
VEHICLE HAVING SELECTIVELY FIXED OR
FLOATING STEERABLE WHEELS
Filed Aug. 21, 1964  2 Sheets-Sheet 2
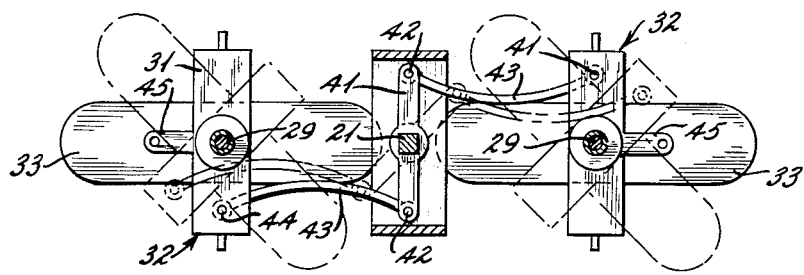
Fig. 6
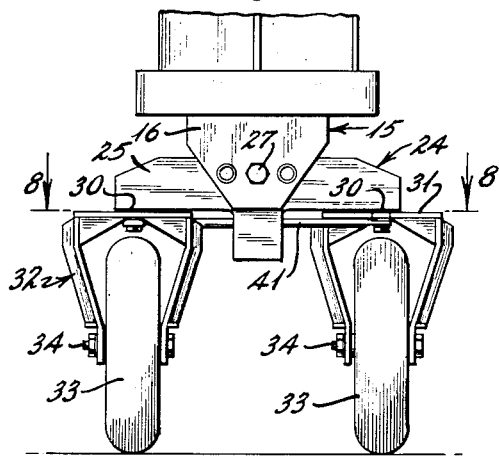
Fig. 7
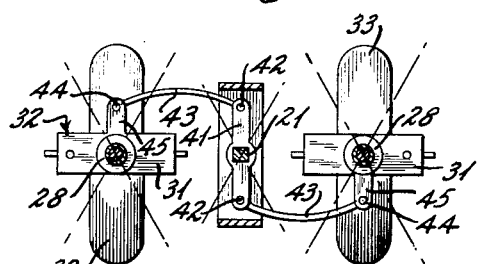
Fig. 8
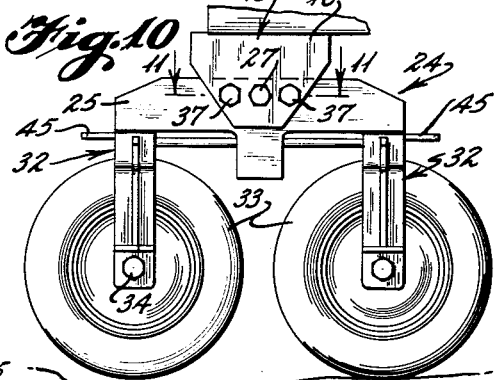
Fig. 10
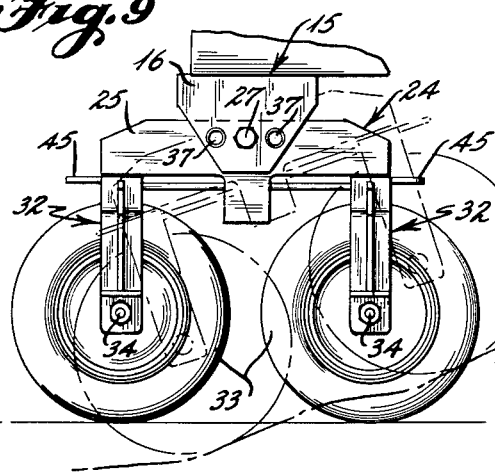
Fig. 9
Fig. 11
INVENTOR
Paul D. Abbott
BY
ATTORNEYS United States Patent Office 3,262,715
Patented July 26, 1966

3,262,715
VEHICLE HAVING SELECTIVELY FIXED OR
FLOATING STEERABLE WHEELS
Paul D. Abbott, P.O. Box 187, Blytheville, Ark.
Filed Aug. 21, 1964, Ser. No. 391,252
5 Claims. (Cl. 280—95)

This invention relates to the propelling of vehicles including over rough terrain and to apparatus and equipment for steering or guiding the vehicle in a more positive manner.

The invention relates particularly to the steering or guiding of tractors or other farm vehicles across a field and includes an adjustable floating or fixed steering mechanism attachable to the front of the tractor and controlled by the operator to provide more positive control of the guidance as well as to permit the tractor to travel in places where prior tractors have not been able to go.

Heretofore farm tractors and other vehicles have had relatively large drive wheels and usually have had a pair of small front wheels located either in side-by-side relation or widely spaced for travelling in the furrows of a cultivated field. These front or guidance wheels have been relatively small and when the tractor was used on rough terrain, such as cross plowing, the front of the tractor would follow the contour of the earth and would have an exaggerated up-and-down movement. Also, the tractor could not cross an irrigation ditch since the front wheels were not large enough to span the ditch.

It is an object of the invention to provide an adjustable floating or fixed steering mechanism for a tractor having a pair of steerable wheels which can be located either in alignment with each other or in side-by-side relation.

Another object of the invention is to provide a steering mechanism having a pair of steerable wheels mounted on a frame and such frame can be freely floating in one direction relative to the tractor, or such frame can be adjusted to remain in a fixed position.

Still another object of the invention is to provide a floating or fixed steering mechanism for a tractor including a pair of steerable wheels mounted on a frame and capable of being disposed in spaced side-by-side relation to straddle a furrow or irrigation ditch, or such wheels can be arranged in alignment with each other to cross the furrows of a field or an irrigation ditch.

Other objects and advantages of the invention will be apparent from the following description taken in conjunction with the accompanying drawings in which:

FIG. 1 is a perspective illustrating one application of the invention with the steerable wheels disposed in alignment with each other;

FIG. 2, an enlarged front elevation of the steering mechanism of FIG. 1;

FIG. 3, an enlarged horizontal section along the line 3—3 of FIG. 1;

FIG. 4, a partial vertical section along the line 4—4 of FIG. 3;

FIG. 5, an enlarged section along the line 5—5 of FIG. 4;

FIG. 6, a section along the line 6—6 of FIG. 4;

FIG. 7, a front elevation similar to FIG. 2 but at a reduced scale and illustrating the steerable wheels in side-by-side relation;

FIG. 8, a section on the line 8—8 of FIG. 7;

FIG. 9, a side elevation illustrating the wheels in alignment with each other and freely floating to follow the contour of the earth;

FIG. 10, a similar view illustrating the wheels in fixed position; and,

FIG. 11, an enlarged fragmentary vertical section on the line 11—11 of FIG. 10.

Briefly stated the present invention is a steering mechanism for a tractor or the like having a pair of relatively small front wheels pivotally carried by a carriage and such carriage is mounted on a frame adjustably connected to the chassis of the tractor. The frame can be mounted so that the length of the carriage is disposed either along the path of travel of the tractor and the wheels are in end-to-end relation, or the frame can be mounted so that the length of the carriage is disposed generally perpendicular to the path of travel of the tractor and the wheels are in spaced side-by-side relation. Means is provided for pivotally mounting the carriage on the frame in such a manner that the carriage can be freely floating in one direction or such carriage can be fixed to the frame when desired. The wheels are connected by a steering linkage to one end of a post projecting downwardly through the frame and carriage, and the opposite end of such post is connected to the steering column of the tractor so that the tractor can be guided regardless of the disposition of the carriage and the wheels.

With continued reference to the drawings a tractor 10 having rear ground-engaging drive wheels 11 is provided with a chassis 12 and a steering wheel 13 mounted on one end of a steering column 14. A generally inverted U-shaped frame 15 having depending arms 16 connected by a web or intermediate portion 17 is removably mounted beneath the forward portion of the chassis 12 by bolts or other fasteners 18. Such bolts extend upwardly through openings 19 in the web 17 and are secured within threaded openings (not shown) in the chassis 12. The openings 19 are drilled on a common bolt circle from the center of the web 17 and are located substantially 90° apart so that the frame can be rotated substantially 90° and the openings in the web will be in alignment with the threaded openings in the chassis. A relatively large opening 20 is provided in the center of the web 17 for the reception of a steering post 21 connected at its upper end to the steering column 14. A pair of depending auxiliary arms 22 are welded or otherwise attached to the web 17 in spaced generally parallel relation with the arms 16 for a purpose which will be described later.

An elongated carriage 24 having side members 25 connected by structural members such as I-beams 26 is provided and such side members are received between the arms 16 and the auxiliary arms 22 of the frame 15. As illustrated in FIG. 11, the carriage 24 is pivotally connected to the arms 16 and the auxiliary arms 22 by a bolt 27 which extends through a sleeve 27' carried within openings in the arms 16, the side members 25 and the auxiliary arms 22 with the opening in the side members 25 being disposed along the vertical center line thereof.

In order to guide the tractor, each of the I-beams 26 has a bushing 28 located along the longitudinal center line of the carriage and such bushing rotatably receives a post 29 which extends downwardly through a thrust bearing 30 and the bight portion 31 of a yoke 32 in such a manner that a yoke is pivotally mounted beneath each of the I-beams 26. A steerable wheel 33 mounted on an axle 34 is supported at the free ends of each of the yokes 32 so that the wheels are freely rotatable.

From the above description it will be obvious that the carriage 24 can be floatingly mounted on the frame 15. In order to secure the carriage in fixed position the arms 16 of the frame are provided with a pair of openings 35, one on each side of the bolt 27 and the side members 25 have threaded openings 36 which are in registry with the openings 35 when the carriage is substantially level. Bolts 37 are then inserted through the openings 35 and received within the threaded openings 36 to secure the carriage against the rotation about the bolts 27.

In order to steer the mechanism a universal 40 is connected to the lower end of the steering post 21 and a lever 41 is attached to the opposite end of such universal. The lever 41 extends outwardly from both sides of the universal and each of the free ends of such lever is pivotally connected by a pin 42 to a link 43. As illustrated in FIG. 6 when the wheels are in end-to-end relation the opposite end of the link 43 will be connected by a pivot pin 44 to the yoke 32 so that when the steering post is rotated the lever 41 also will be rotated which in turn will rotate the yokes about the posts 29 to cause the wheels to change direction so that the tractor can be guided. As illustrated in FIG. 8 when the wheels are in side-by-side relation the links 43 will be connected by pivot pins 44 to a lug 45 carried by the yoke 32 and extending substantially at right angles thereto.

In the operation of the device the frame 15 may be mounted on the chassis so that the carriage 24 is disposed along the path of travel and the wheels 33 are in end-to-end relation. When the tractor is operating over a relatively smooth surface the carriage 24 preferably is freely floating so that most of the bumps and unevenness of the surface will be absorbed by the floating carriage and very little bouncing will be transmitted to the front of the tractor. When the tractor is to be used over rough terrain such as cross plowing in a field, it is desirable to secure the carriage in fixed position to the frame so that one of the wheels will be supporting most of the weight of the tractor while the other wheel will be suspended and out of engagement with the earth. As an example, when the steerable wheels 33 are approaching a hill the front wheel will engage the hill and roll up the same during which time the rear wheel will be out of engagement with the ground. As the front wheel crosses the top of the hill and begins its descent the rear wheel will come into contact with the hill adjacent to the top and the weight will be transferred from the front wheel to the rear wheel. After the rear wheel goes over the hill the front wheel will engage the next hill and the weight of the tractor will again be transferred to the front wheel. This action results in a slight up-and-down movement of the front of the tractor and causes two small bumps rather than one large bump.

When the frame is mounted on the chassis so that the carriage is perpendicular to the path of travel of the tractor the wheels are in side-by-side relation and if spaced a sufficient distance apart the tractor can move lengthwise of a field without damaging the crops. Also in this position the tractor is capable of straddling an irrigation ditch or the like and when the carriage is secured to the frame the tractor can be steered away from the ditch since one of the steerable wheels will always be in contact with the earth and the other wheel will be suspended until after the ditch has been crossed. The drive wheels 11 of the tractor normally are of sufficient diameter that they can bridge the irrigation ditch without trouble.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. An adjustable floating or fixed steering mechanism for a tractor comprising a frame, means for removably mounting said frame on said tractor, an elongated carriage pivotally mounted on said frame, means for selectively fixing said carriage to said frame, at least one steerable wheel pivotally attached to each end of said carriage, a post connectable to the steering wheel of said tractor and extending downwardly through said frame, a universal joint connected to one end of said post, a lever fixed to said universal joint, and links connecting each of said wheels to said lever, whereby said frame is removably mounted in either of two positions which are approximately ninety degrees apart and said carriage can be either floating or fixed relaive to said frame.

2. Apparatus for selectively mounting steerable front wheels on a vehicle having steering means comprising a frame, means for selectively mounting said frame on said vehicle in multiple positions in alignment with or at an angle to the longitudinal axis of said vehicle, an elongated carriage rockably mounted intermediate its ends on said frame, means for pivotally mounting at least one ground-engaging wheel adjacent each end of said carriage, link means connecting said wheel mounting means to each other, and steering control means connecting said link means to said vehicle steering means, whereby said frame is removably mounted in a selected position on said vehicle and the direction of said ground-engaging wheels can be controlled by said vehicle steering means.

3. The structure of claim 2 including means for seleccan be controlled by said vehicle steering means.

4. The structure of claim 2 in which said frame is mounted on said vehicle so that said carriage is disposed along the longitudinal axis of said vehicle and said wheels are in spaced end to end relation.

5. The structure of claim 2 in which said frame is mounted on said vehicle so that said carriage is disposed transversely of the longitudinal axis of said vehicle and said wheels are in spaced side by side relation.

References Cited by the Examiner

UNITED STATES PATENTS

| | | | |
|---|---|---|---|
| 1,601,510 | 9/1926 | Rhodes | 280—95 |
| 2,099,304 | 11/1937 | Kepler | 280—95 |
| 2,483,619 | 10/1949 | Brown et al. | 180—21 X |
| 2,722,428 | 11/1955 | Longbotham | 280—111 X |
| 2,800,336 | 7/1957 | Major et al. | 280—95 X |
| 2,808,269 | 10/1957 | Cathey. | |
| 2,890,892 | 6/1959 | Strehlow | 280—92 |
| 3,041,082 | 6/1962 | Burkdoll et al. | 280—34 |
| 3,080,175 | 3/1963 | De Marco | 280—95 |
| 3,107,103 | 10/1963 | Lely | 180—79.1 X |

FOREIGN PATENTS

| | | |
|---|---|---|
| 1,287,426 | 2/1962 | France. |

KENNETH H. BETTS, *Primary Examiner.*